United States Patent [19]

Murai et al.

[11] 4,384,837

[45] May 24, 1983

[54] APPARATUS FOR PRETREATMENT FOR EXTRACTING CRUDE OIL FROM RICE BRAN

[75] Inventors: Saburo Murai; Kiyoshi Nakagawa, both of Ichinomiya, Japan

[73] Assignee: Oryza Oil & Fat Chemical Co., Ltd., Kasamatsucho, Japan

[21] Appl. No.: 197,092

[22] PCT Filed: Nov. 21, 1978

[86] PCT No.: PCT/JP78/00032

§ 371 Date: Jul. 8, 1980

§ 102(e) Date: Jul. 8, 1980

[87] PCT Pub. No.: WO80/01074

PCT Pub. Date: May 29, 1980

[51] Int. Cl.[3] .......... A23P 1/00

[52] U.S. Cl. .......... 425/202; 264/118; 264/141; 264/177 R; 366/81; 366/89; 425/208; 425/376 B; 425/380; 426/516; 426/518

[58] Field of Search .......... 264/177 R, 140, 118, 264/141, 142, 143, 101, 102; 425/382 R, 202, 380, 208, 376 B; 366/81, 89; 426/518, 516, 503

[56] References Cited

U.S. PATENT DOCUMENTS

| | | | |
|---|---|---|---|
| 1,099,557 | 6/1914 | Lorenz et al. | 426/518 |
| 2,581,031 | 1/1952 | Kruzik | 366/81 |
| 2,994,105 | 8/1961 | Seal et al. | 264/118 |
| 3,362,044 | 1/1968 | Irving | 425/202 |
| 3,421,902 | 1/1969 | Wayne | 426/518 |
| 3,422,866 | 1/1969 | Wayne | 426/518 |
| 3,505,085 | 4/1970 | Straughn et al. | 425/208 |
| 3,695,891 | 10/1972 | Fox | 426/516 |
| 4,104,958 | 8/1978 | Manser et al. | 425/382 R |
| 4,118,164 | 10/1978 | Wenger et al. | 425/202 |
| 4,125,635 | 11/1978 | de Ruyter | 264/202 |

FOREIGN PATENT DOCUMENTS

| | | | |
|---|---|---|---|
| 36-9580 | 4/1961 | Japan . | |
| 1259105 | 1/1972 | United Kingdom | 425/208 |

OTHER PUBLICATIONS

*Kojo Sosa Series* (*No. 18*) *Zoryu-hen,* 1-1972, Kaga-Ku Kogyo-sha, Wakinohama Hiroshi, "Oshidashi Shiki Zoryuki To Sono Sochi", pp. 18-32.

*Primary Examiner*—Jeffery R. Thurlow

*Attorney, Agent, or Firm*—Martin A. Farber

[57] ABSTRACT

This invention pertains to a field of the art for producing crude oil from rice bran, and it relates to a pretreatment method for extracting crude oil from rice bran and an apparatus used therefor.

The object of this invention is to obtain an extremely high-quality and light-colored crude oil from rice bran while eliminating any risk of environmental pollution in the pretreatment process for the extraction. In order to accomplish this object, as the pretreatment for extracting crude oil from rice bran, said rice bran is compressed in a screw extruder to break the cells in said rice bran and mold it into a form suited for the extraction of crude oil.

11 Claims, 11 Drawing Figures

APPARATUS FOR PRETREATMENT FOR EXTRACTING CRUDE OIL FROM RICE BRAN

FIELD OF THE ART

This invention relates to a pretreatment apparatus for extracting extremely light-colored and high-quality crude oil from rice bran without giving rise to environmental pollution.

BACKGROUND OF THE INVENTION

There are known several pretreatment methods for extracting crude oil from rice bran, such as for example a heat treating method involving heating and drying of the material rice bran at a temperature above 80° C. or a cooking method where heating and drying are performed after adding steam or hot water to the material.

According to these known methods, the heat-instable components in the rice bran undergo the thermal changes (such as fixation of the coloring matter, promoted migration of the acetone insolubles into oil, etc.) under the actions of heat and oxygen in the air during the cooking treatment, resulting in production of only dark-brownish crude oil containing many impurities. Further, refining of such crude oil requires the completed processing steps, a large quantity of chemicals and much energy and labor and also involves the problem of generation of hard-to-treat soil water and a great volume of waste clay. Also, in the case of steam cooking, a peculiar offensive smell would be produced to cause environmental pollution.

In the extraction operation, it is common practice to pelletize the steamed rice bran with the object of promoting material migration in the liquid and hydro-extraction of the extracting solvent, but since a heat treatment with steam is involved in the process, it was impossible with such means to obtain crude oil with good quality. An ordinary type of screw extruder can be used for molding of said steamed rice bran because such steamed rice bran, unlike raw bran, is highly viscous and fluid and hence easily pelletizable. However, direct pelletization of raw bran by an extruder requires the treatment to be carried out under a high pressure because of poor viscosity and fluidity.

The dies employed in the commonly used screw extruders can not stand high pressures (above 400 $kg/cm^2$), and if the die wall thickness is increased for providing endurance against such high pressures, the die slot is necessarily elongated to increase the surface area of the slot so that a higher pressure is required for accomplishing the desired extruction. Thus, great difficulties were involved with the use of a common type screw extruder for the pretreatment for extracting crude oil from rice bran.

SUMMARY OF THE INVENTION

This invention relates to a pretreatment apparatus for extracting extremely light-colored and high-quality crude oil from rice bran, in which the material (rice bran) is compressed by a screw extruder to break the cells in the rice bran and mold it into a form suited for extracting the crude oil from a die set at the front end of the extruder.

According to this invention, rice bran is treated by a screw extruder at a relatively low temperature under a high pressure and in a very short period of time with the material being kept clear of oxygen so that the material undergoes no thermal change which may otherwise be caused by the actions of heat and oxygen in the air as often seen in the conventional methods. Also, it is possible to obtain extremely light-colored and high-quality crude oil at the time of extraction, and no offensive smell is produced in the process to ensure its advantage with respect to environmental protection, too.

This invention provides an apparatus comprising a cylinder 1 opened at its front end and having at its rear end a hopper 2 for supplying rice bran, a screw 6 provided in said cylinder so as to be driven by a driving power source, said screw being so configured that the rice bran in the cylinder 1 will be carried forwards with revolution of the screw and that the compression ratio of rice bran will become higher as it is transferred forwardly, a ring-shaped molding die 10 adapted at the front end of said cylinder 1, and a head 9 mounted securely at the foremost end of the screw 10 such that a minute space is defined between said head 9 and said die 10.

According to the apparatus of this invention, as compared with the dies used in said conventional type of screw extruders, the area applied with pressure is reduced and also the die is protected by a strong die holder to thereby allow practice of the method above described. This is due to the fact that not the entirety of one end face of the cylinder forms the outlet of the treated rice bran but 80% (in section) of said end face is taken by the screw head and a die is disposed in the remaining 20% portion to allow passage of rice bran therethrough. The apparatus can also accommodate use of the dies with various wall thicknesses, and hence the degree of treatment can be adjusted as desired by suitably selecting the die. Further, the apparatus of this invention allows treatment of a measured amount of rice bran as it has the function of a constant-rate feeder. Also, if the die unit is directly connected to the extractor, any risk of solvent gas leakage can be eliminated because sealing of the die unit is perfect.

Described below are the results of an experimental practice of this invention.

Rice bran with moisture content of 14.5% and temperature of 30° C. was supplied at the rate of 1,500 kg/h into a screw extruder designed to have the optimal throughput capacity of 1,500 kg/h. The electrical power requirement of the driving motor was approximately 20.6 KW, and the pellets extruded out of the extruder had the temperature of 58° C. These pellets were air-cooled and then subjected to an extraction treatment with hexane according to a normal method. The properties of the thus extracted crude oil are shown in Table 1 below in comparison with those of the crude oil obtained from a cooking pretreatment according to a conventional method. The results of the visible absorption spectral measurements are shown in FIG. 9, wherein curve a represents the spectrum of the crude oil obtained from the pellets produced through the pretreatment according to this invention, and curve b represents the spectrum of the crude oil obtained from the material which has undergone a cooking treatment according to a conventional method. It will be appreciated from this graphic comparison that the process of this invention can produce an excellent rice bran crude oil.

In Table 1 below, items (1), (3), (4) and (5) were measured according to the Standard Oils and Fats Analytical Test Methods complied by the Japan Oil Chemistry Association. (2) shows substantially the wax content (including a part of phosphatide).

The analysis was carried out by adding 100 ml of saturated hydrous methyl ethyl ketone to 20 gr of each sample, agitating the mixture and then measuring the amount of acetone insolubles.

TABLE 1

| | Crude oil properties | |
|---|---|---|
| | Pretreatment method | |
| Properties of crude oil | Crude oil obtained from pellets after pretreatment of this invention | Crude oil obtained from rice bran cooked according to a conventional method |
| (1) Acid value | 27.7 | 28.2 |
| (2) Content of saturated hydrous methyl ethyl ketone insolubles (%) | 0.1 | 1.0 |
| (3) Content of acetone insolubles in oil from which the saturated hydrous methyl ethyl ketone insolubles have been removed (%) | 0.61 | 2.56 |
| (4) Content of unsaponifiables in oil from which the saturated hydrous methyl ethyl ketone insolubles have been removed (%) | 4.22 | 5.16 |
| (5) Oil color (Gardner color scale) | 10 | 11-12 |

BRIEF DESCRIPTION OF THE DRAWINGS

The drawings illustrate a preferred embodiment of this invention, wherein.

DESCRIPTION OF THE PREFERRED EMBODIMENT

Figure 1:
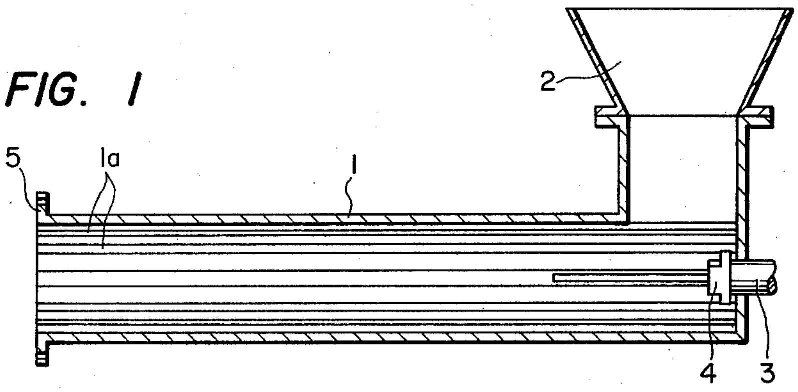
FIG. 1 is a side sectional view of the cylinder.
Figure 2:
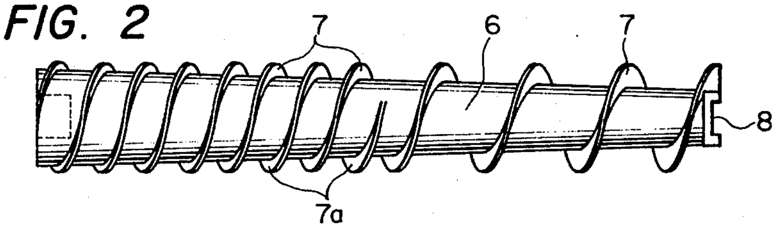
FIG. 2 is a side elevational view of the screw.
Figure 3A:
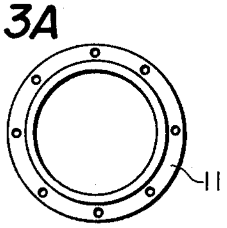
FIG. 3A is a front view of the die holder.
Figure 3B:
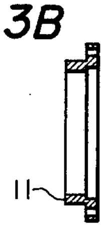
FIG. 3B is a side sectional view thereof.
Figure 4A:
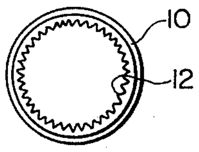
FIG. 4A is a front view of the die.
Figure 4B:
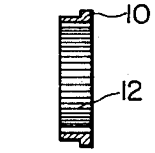
FIG. 4B is a side sectional view thereof.
Figure 5:
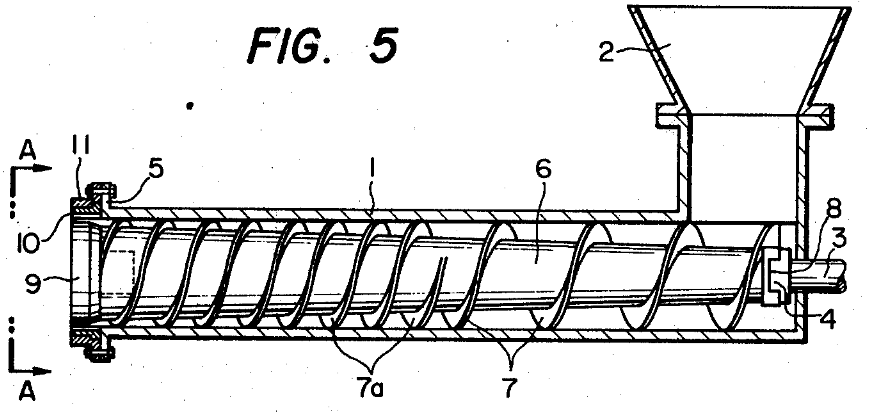
FIG. 5 is a side sectional view of the apparatus according to this invention.
Figure 6:
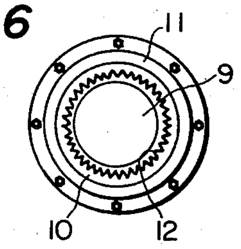
FIG. 6 is a view of the apparatus of FIG. 5 taken in the direction of arrows A—A of FIG. 5.
Figure 7:
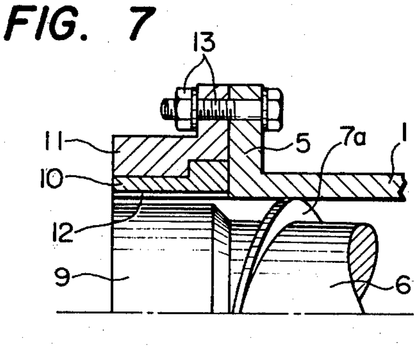
FIG. 7 is an enlarged side sectional view of the die assembly.
Figure 8:
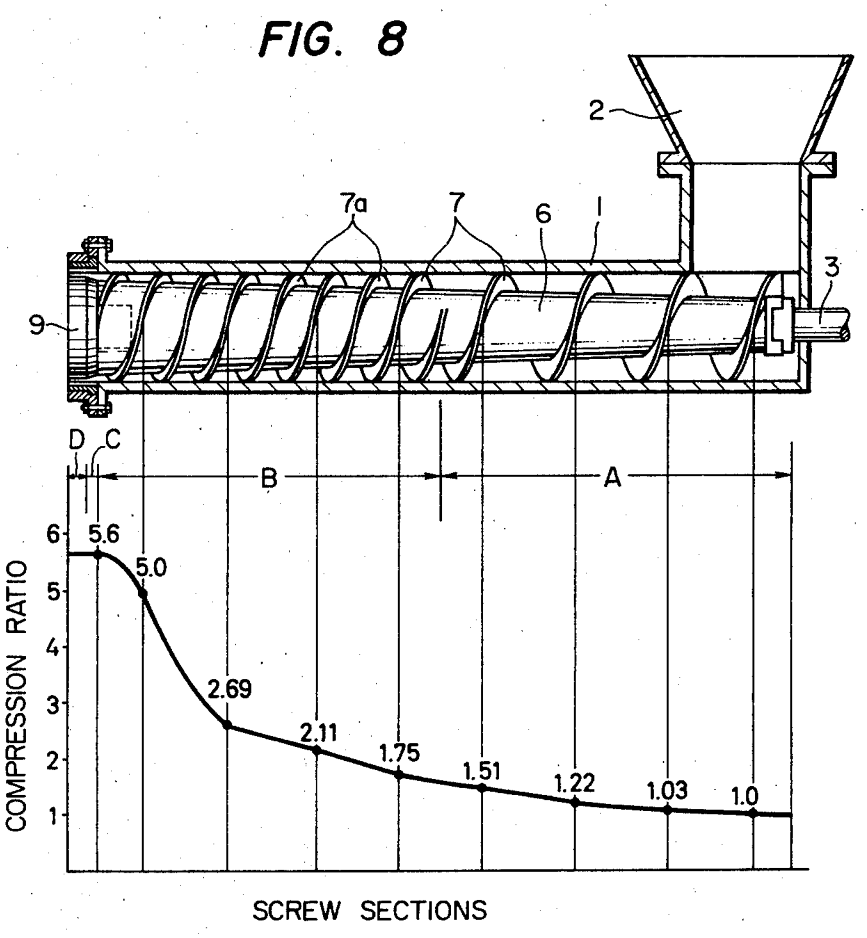
FIG. 8 is a diagram showing the compression ratios at the various sections of the cylinder.
Figure 9:
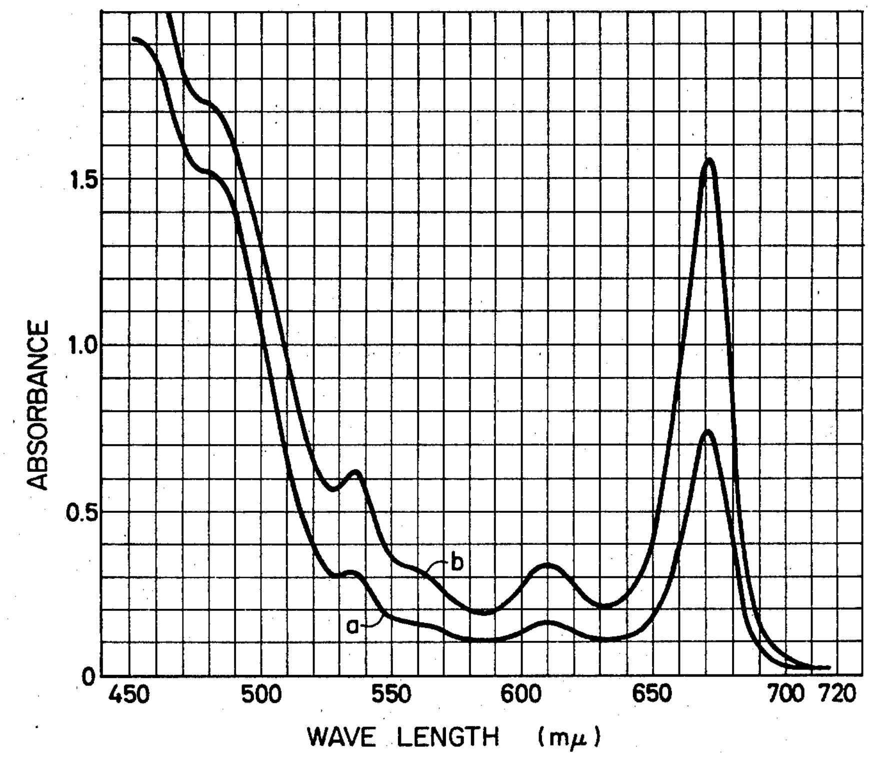
FIG. 9 is a nomogram showing the visible absorption spectra of crude oil.

Referring to the drawings illustrating an embodiment of this invention, numeral 1 indicates a cylinder having provided at its upper rear part a hopper 2 for supplying rice bran, and a driving shaft 3 is joined to the rear end of the cylinder. The driving shaft 3 has secured to its inner end an engaging cam 4. The front end of the cylinder 1 is opened and provided with a peripheral flange 5. Engraved on the inner wall surface of the cylinder 1 are a plurality of grooves 1*a* extending axially parallel to each other so as to allow transfer of rice bran in a preferred form while controlling its movement following the screw rotation. Indicated by numeral 6 is a screw housed in said cylinder 1, with the stem portion of said screw being tapered toward the rear end and provided with a thread comprising vanes 7, 7*a* circumferentially thereof. The screw vane 7 is a single piece and arranged to extend spirally from one end of the screw to the other with a constant pitch, while the other vane 7*a* starts from the front end of the screw stem and terminates at a central part thereof, and as seen in the drawings, both vanes are arranged to spiral alternatingly to each other. The taper of the stem portion of the screw 6 and arrangement of its vanes 7, 7*a* are properly selected such that the compression ratio along the screw will become higher as the distance from the rear end of the screw increases this is in a direction toward the front end, in accordance with the volumetric variation resulting from the forwardly decreasing space between the screw 6 and the cylinder 1 as shown in FIG. 8. At the rear end of the screw 6 a recess 8 is formed in which a engaging cam 4 of said driving shaft 3 is fitted so that the revolution of the driving shaft 3 is transmitted to the screw 6 for corresponding driving revolution. Secured to the front end of the screw 6 is a head 9 having a larger diameter than the front end of the screw 6. Also provided at the front end of the cylinder 1 is a die 10 secured in position by a die holder 11, said die having provided circumferentially on its inner peripheral surface a multiplicity of molding grooves 12 extending parallel to each other axially of the die. Numeral 13 designates a bolt and nut unit for fastening said members.

A more detailed explanation is here made on the taper of the stem portion of said screw 6 and its vanes 7, 7*a*. Since the quality of the extracted crude oil is greatly effected by the degrees of compression and kneading of rice bran, the pitch-by-pitch volumetric variation of the screw is decided with circumspection so that the following effect is produced. That is, as shown in FIG. 8, mostly forward transfer of the material (rice bran) is effected in the section A of the screw, while compression and kneading of the material are performed in the section B. By this operation, the air existing in the rice bran is driven back, allowing the rice bran particles to adhere closely to each other, whereby the voids between the bran particles are almost eliminated so that the mass of rice bran is densely packed close to true density. The sectional area of the region where the material flows is further reduced gradually in the section C to give a certain orientation to the rice bran particles to better extractability thereof, and in the final section D, the material is given the highest pressure and molded by the die into a form best suited for extracting the crude oil. The compression ratios of the rice bran at the various sections in the cylinder are as shown in FIG. 8.

If the screw pitch is set to produce such pattern of volumetric variation as to induce excessively high compression ratios in said respective sections, the supplied rice bran is solidified at the region where the value of the compression ratio relative to the inlet area is 5 to 6, and such rice bran deposits on the screw and is hardly discharged out. Also, if the setting is made such that slightly higher compression ratios are provided, the rice bran is kneaded more than necessary in the screw area to cause an excess rise of temperature and the crude oil obtained from the extraction becomes too thick in color. On the other hand, in case the setting is made such that the compression ratios produced are lower than shown in FIG. 8, although the rise of temperature of rice bran is limited, the structural change of the cells becomes incomplete due to insufficient kneading, making the extraction operation difficult to continue. From these and additional facts that the bulk specific gravity of raw bran is approximately 0.3 and the true specific gravity thereof is approximately 1.5, it may be said that the propriety of the setting for providing a compression ratio of 5 to 6 is theoretically supported, and this figure is always employed when performing the pretreatment of raw bran in a most preferred way according to the system of this invention.

Now, the die 10 used in the apparatus of this invention is described in detail. Since the die itself is an expendable member that needs to be replaced once every three to six months, such die is required to be tough and easy to work and mount. The molding grooves 12 are preferably semi-cylindrical for the reason of workability, but they may be of any other configuration provided that no adverse effect is given to the crude oil extraction efficiency. The grooves with an extremely small specific area are of course inadequate. The space between the inner circumferential surface of the die 10 and the outer circumferential surface of the head 9 is preferably within the range of about 0.1 to about 2.0 mm. The properties of the obtained pellets are changed depending on the size of said space. This space must have an opening ratio within the coverage of the volumetric change which corresponds to the volumetric expansion, amounting at highest to 1.3 (specific gravity of the pellet) of the treated bran which has been compressed close to true specific gravity 1.5 in the compression zone. If such opening ratio is too high, the produced pellet proves to be soft and the bran tends to separate from the pellet surface to bring about an undesirable result for the extraction operation, while if said opening ratio is too small, a great deal of power is required and the crude oil obtained by the extraction is thick in color. Thus, the opening ratio is defined to about 10 to 15% of the sectional area of the cylinder. The space between the die 10 and the head 9 is very small, but when the rice bran exists in the cylinder, the screw is always maintained in its fixed position, so that the die and head will not touch each other even if the space therebetween is only about 0.1 mm.

For extracting crude oil, first the material rice bran is screened in a usual way and the crushed rice grains and other foreign matter are removed by air classification. Then the material rice bran is fed into the screw extruder of this invention and subjected therein to compression, kneading and molding while shutting off air to thereby complete the pretreatment, and the thus pretreated rice bran is then subjected to a usual extraction treatment to extract the crude oil.

AVAILABILITY FOR INDUSTRIAL UTILIZATION

This invention can be practiced industrially for extracting crude oil from rice bran and can be a great benefit to the machine manufacturing and crude oil extraction industries.

What is claimed is:

1. A pretreatment apparatus for use in extracting crude oil from rice bran, comprising a cylinder being open at a front end and operatively closed at a rear end thereof, means comprising a hopper for feeding rice bran to said cylinder at a rear end portion thereof, screw means disposed in said cylinder for being rotated by a driving power source, and comprising a shaft having a diameter increasing gradually toward a front end thereof corresponding to the front end of the cylinder and having a thread on an outer circumferential surface of said shaft so as to extend from a rear end thereof to said front end thereof, said thread comprising a front vane and a rear vane separated from each other at an intermediate portion of said shaft, adapted to transfer the rice bran fed to said cylinder, in a forward direction as said screw means is rotated, and being designed in cooperation with said cylinder and said shaft such that a compression ratio with respect to the rice bran increases gradually toward the front end of said cylinder, a head is fixedly joined to the front end of said shaft, said head has an outer circumferential surface, a ring type molding die is joined to said front end of said cylinder so as to form an annular space constituting a narrow annular clearance between an inner circumferential surface of said molding die and said outer circumferential surface of said head, the entire said inner circumferential surface of said molding die being unperforated and forming a plurality of molding grooves extending parallel to one another in a direction of the axis of said molding die and and in cooperation with said head constituting means for extracting the rice bran which enters said molding grooves exclusively from said narrow annular clearance therebetween.

2. The apparatus as set forth in claim 1, wherein the space formed between the molding die 9 and the head 9 has the opening ratio of 10 to 15% of the section area of the cylinder.

3. The pretreatment apparatus according to claim 1, wherein said shaft of said screw means is tapered such that a pressure is produced at a front end portion of said screw means in said cylinder upstream of said molding die relative to that at said rear end portion of said cylinder adjacent to said hopper which defines a compression ratio from 5–6.

4. The pretreatment apparatus according to claim 1, wherein said head has a frustoconical portion with diameter increasing in a forward direction, said frustoconical portion at a smallest diameter portion thereof is connected to said front end of said shaft and said head has a cylindrical portion defining a diameter greater than the diameter of the front end of said shaft.

5. The pretreatment apparatus according to claim 1, wherein said rear vane continues substantially up to said front end of said shaft, and said rear vane spirals alternately with said front vane between said front end of said shaft and said intermediate portion of said shaft.

6. The pretreatment apparatus according to claim 1, wherein said molding grooves are semi-cylindrical.

7. The pretreatment apparatus according to claim 6, wherein said space between the inner circumferential surface of the molding die and the outer circumferential surface of the head is within the range of about 0.1 to about 2.0 mm.

8. The pretreatment apparatus according to claim 1, wherein a degree of taper of said shaft is set such that an operation for kneading the rice bran under pressure is substantially completed in a position which is immediately upstream of the molding die.

9. The pretreatment apparatus according to claim 1, wherein a compression ratio at the molding die is substantially equal to the compression ratio of that portion of the cylinder which is immediately upstream of the molding die.

10. The pretreatment apparatus as set forth in claim 1, wherein said head has a front surface which is uncovered, said ring type molding die being disposed annularly around said outer circumferential surface of said head with the front surface of said head being freely exposed.

11. The pretreatment apparatus as set forth in claim 10, wherein said ring type molding die has a front end, said front end defines an annular surface substantially aligned in the same plane as that of said uncovered front surface of the head.

* * * * *

UNITED STATES PATENT AND TRADEMARK OFFICE

CERTIFICATE OF CORRECTION

PATENT NO. : 4,384,837

DATED : May 24, 1983

INVENTOR(S) : Saburo Murai, et al

It is certified that error appears in the above-identified patent and that said Letters Patent are hereby corrected as shown below:

Column 6, Line 40, (Claim 2) "9" both occurrences should be deleted.

Signed and Sealed this

*Thirtieth* Day of *August 1983*

[SEAL]

*Attest:*

GERALD J. MOSSINGHOFF

*Attesting Officer* *Commissioner of Patents and Trademarks*